(12) United States Patent　　(10) Patent No.:　US 12,668,167 B2
Mullett　　(45) Date of Patent:　Jun. 30, 2026

(54) SEAL ASSEMBLY OF A SLIDE-OUT FOR A FIFTH WHEEL TRAVEL TRAILER AND SYSTEM THEREOF

(71) Applicant: FOREST RIVER, INC., Elkhart, IN (US)

(72) Inventor: Ira Mullett, Shipshewana, IN (US)

(73) Assignee: FOREST RIVER, INC., Elkhart, IN (US)

( * ) Notice: Subject to any disclaimer, the term of this patent is extended or adjusted under 35 U.S.C. 154(b) by 419 days.

(21) Appl. No.: 18/140,074

(22) Filed: Apr. 27, 2023

(65) Prior Publication Data

US 2023/0347811 A1　　Nov. 2, 2023

Related U.S. Application Data

(60) Provisional application No. 63/337,321, filed on May 2, 2022.

(51) Int. Cl.
　　*B60P 3/34*　　　(2006.01)
　　*B60R 13/06*　　(2006.01)
(52) U.S. Cl.
　　CPC .............. *B60P 3/34* (2013.01); *B60R 13/06* (2013.01)
(58) Field of Classification Search
　　None
　　See application file for complete search history.

(56) References Cited

U.S. PATENT DOCUMENTS

| | | | | |
|---|---|---|---|---|
| 5,237,782 | A * | 8/1993 | Cooper ..................... | B60P 3/34 |
| | | | | 296/171 |
| 7,419,202 | B1 * | 9/2008 | Hanser ..................... | B60P 3/34 |
| | | | | 52/67 |
| 7,614,676 | B2 * | 11/2009 | Ksiezopolski .......... | B60J 10/00 |
| | | | | 296/171 |
| 8,875,443 | B2 | 11/2014 | Siegel | |
| 8,910,422 | B2 | 12/2014 | Siegel | |
| 8,985,662 | B2 * | 3/2015 | Siegel ..................... | B60R 13/06 |
| | | | | 296/165 |
| 9,409,532 | B2 | 8/2016 | Ksiezopolski | |
| 9,796,321 | B2 * | 10/2017 | Ksiezopolski ......... | F16J 15/025 |
| 2016/0243974 | A1 * | 8/2016 | Goode ................... | F16J 15/027 |
| 2021/0291717 | A1 | 9/2021 | Schwindaman | |

* cited by examiner

*Primary Examiner* — Joseph D. Pape
(74) *Attorney, Agent, or Firm* — Taft Stettinius & Hollister LLP; Stephen F. Rost

(57)　　　　　ABSTRACT

A recreational travel trailer includes a chassis and a body supported by the chassis. The body includes a side wall that forms an opening, and a slide out assembly is movably coupled to the body or chassis. The slide out assembly includes an outer wall forming an outer periphery of the slide out assembly and at least one trim member coupled to the outer periphery of the slide out assembly. The slide out assembly moves between a closed position and an open position relative to the opening in the side wall. A seal assembly is coupled within a notch formed in the side wall. The seal assembly is disposed in a compressed state when the slide out assembly moves to a closed position.

20 Claims, 7 Drawing Sheets

500

310

312

304

302

SEAL ASSEMBLY OF A SLIDE-OUT FOR A FIFTH WHEEL TRAVEL TRAILER AND SYSTEM THEREOF

RELATED APPLICATIONS

This application claims the benefit of U.S. Provisional Patent Application Ser. No. 63/337,321, filed May 2, 2023, the disclosure of which is hereby incorporated by reference.

FIELD OF THE DISCLOSURE

The present disclosure relates to a travel trailer, and more particularly to a seal assembly of a slide-out for a travel trailer.

BACKGROUND

Recreational fifth wheel travel trailers provide individuals with spacious, comfortable and transportable lodging. In particular, a typical fifth wheel travel trailer comprises a housing member having a multi-level interior living space formed therein, a multi-level chassis adapted to support the housing member, and a carriage member having a plurality of wheels interposed between the chassis and a supporting surface so as to enable the trailer to travel on the supporting surface. Furthermore, the typical fifth wheel trailer is adapted to detachably mount to a towing vehicle so that a front end of the trailer extends beyond the load bearing rear wheels of the towing vehicle so as to enable the towing vehicle to essentially act as a fifth wheel.

Since fifth wheel trailers are currently available with lengths as great as forty-five feet (and possibly longer) and pop-out sections that provide the housing member with increased width, their interior living spaces are able to resemble that of a nicely appointed home. For example, a fifth wheel travel trailer can include a large kitchen, a large bathroom, a large bedroom, and a large living area. Moreover, these trailers typically include multiple water storage tanks for supplying hot and cold water as well as for storing waste water, wiring for distributing electrical power and a central heating/ventilation/air conditioning (HVAC) system for providing desirable environmental conditions within the interior living space.

SUMMARY

In one implementation of the present disclosure, a recreational travel trailer includes a chassis, a body supported by the chassis, where the body includes a side wall that forms an opening, and a slide out assembly movably coupled to the body or chassis. The slide out assembly includes an outer wall forming an outer periphery of the slide out assembly and at least one trim member coupled to the outer periphery of the slide out assembly, wherein the slide out assembly moves between a closed position and an open position relative to the opening in the side wall. A seal assembly is coupled to the side wall and located within a notch formed in the side wall. The seal assembly is disposed in a compressed state when the slide out assembly moves to a closed position.

In one example of this implementation, in the closed position, the at least one trim member is disposed in contact with the seal assembly. In a second example, in the closed position, the seal assembly is located between the at least one trim member and the side wall. In a third example, the seal assembly includes a bulb seal. In a fourth example, the seal assembly is coupled to the side wall along at least three sides of the opening.

In a fifth example, the at least one trim member includes a top trim member, a first side trim member, and a second side trim member; wherein, the seal assembly is disposed in contact with the top trim member, the first side trim member, and the second side trim member in the closed position. In a sixth example, the at least one trim member includes a h-shaped cross-section. In a seventh example, the at least one trim member includes a first portion, a second portion, and a third portion, the first portion and third portion being generally parallel to one another and the second portion being generally perpendicular to the first portion and the third portion. In an eighth example, the outer wall of the slide out assembly is located within a space formed between the first portion, second portion, and third portion of the at least one trim member.

In another implementation of the present disclosure, a recreational travel trailer includes a chassis, a body supported by the chassis, the body including a side wall, and a slide out assembly movably coupled to the body or chassis. The slide out assembly includes an outer wall forming an outer periphery of the slide out assembly and a trim member coupled to the outer periphery of the slide out assembly, wherein the slide out assembly moves between a closed position and an open position relative to the side wall. A wall cap member is coupled to the side wall and forms a notch, and a seal assembly is coupled to the wall cap member. The seal assembly includes a seal support member and a seal. The seal assembly is located within the notch. The wall cap member includes a first portion aligned within a generally vertical plane such that, in the open position, the outer wall is located offset to one side of the vertical plane and the seal assembly is located offset to an opposite side of the vertical plane.

In one example of this implementation, a mold member is disposed in contact with the outer wall of the slide out assembly, wherein the outer wall of the slide out assembly and the mold member are located within a space formed between the first portion, second portion, and third portion of the at least one trim member. In a second example, the seal assembly is disposed in a compressed state when the slide out assembly moves to a closed position. In a third example, the wall cap member includes a generally Z-shaped cross-section. In a fourth example, the seal support member includes a first front surface and a second front surface, a rear surface located offset from the first front surface and the second front surface, and a shelf surface coupled to and disposed generally perpendicular to the rear surface, wherein the seal is coupled to the first front surface and the second front surface.

In another example, the rear surface of the seal support member is coupled to the wall cap member. In yet another example, the side wall includes a frame structure to which the shelf surface of the seal support member is coupled. In a further example, in the closed position, the at least one trim member is disposed in contact with the seal assembly. In yet a further example, in the closed position, the seal assembly is located between the at least one trim member and the side wall.

In a further implementation of the present disclosure, a recreational travel trailer includes a chassis, a body supported by the chassis and including a side wall, the side wall including a frame structure, and a slide out assembly movably coupled to the body or chassis. The slide out assembly includes an outer wall forming an outer periphery of the slide out assembly and a trim member coupled to the outer periphery of the slide out assembly, wherein the slide out assembly moves between a closed position and an open position relative to the side wall. A wall cap member is coupled to the side wall and the frame structure, and a seal assembly is coupled to the wall cap member. The seal assembly includes a seal support member and a seal such that, in the closed position, the at least one trim member is disposed in contact with the seal assembly, and, in the closed position, the seal assembly is located between the at least one trim member and the side wall.

In one example of this implementation, the side wall, the frame structure, and the wall cap form a notch with the seal assembly being located in the notch.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
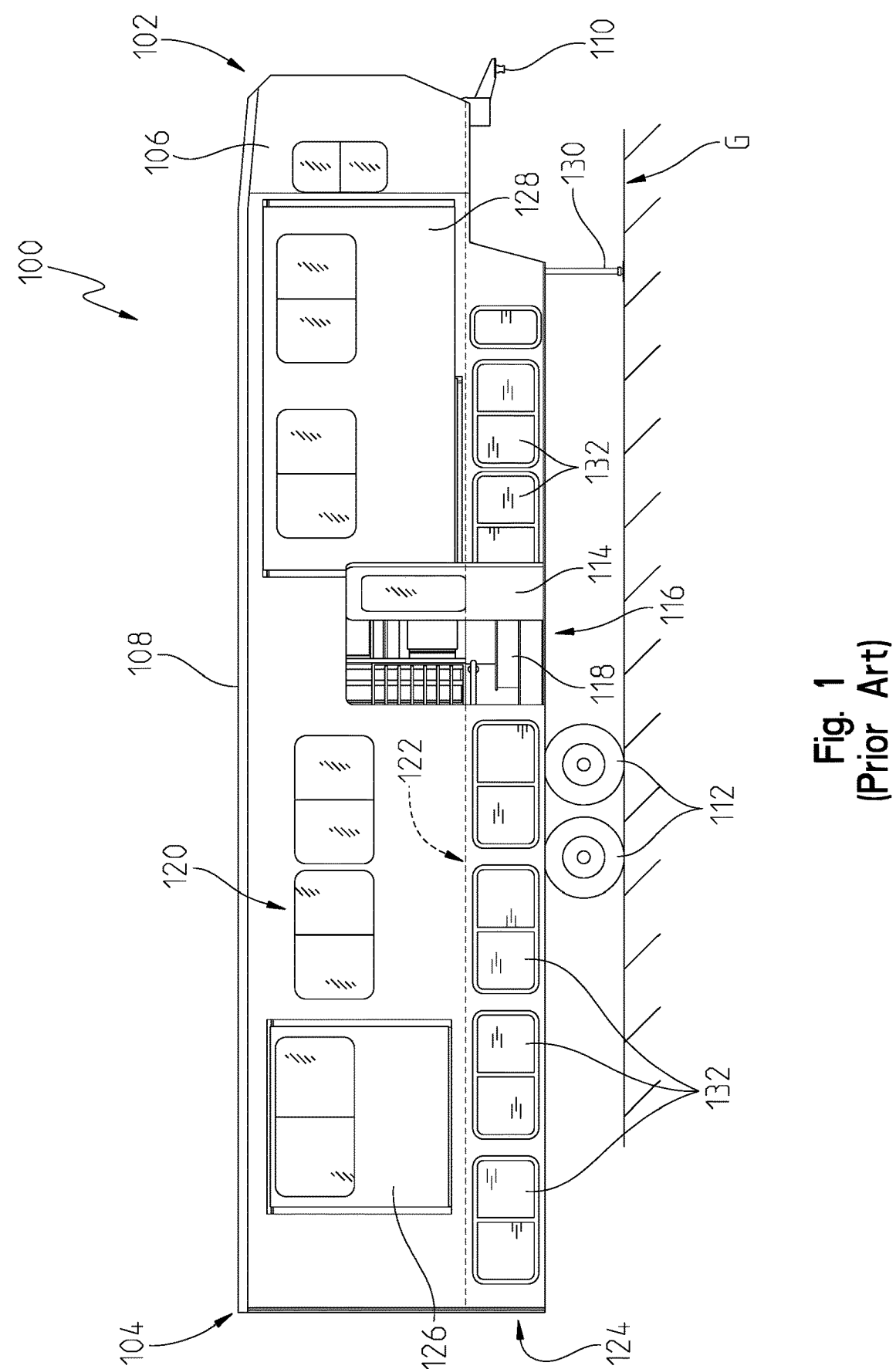
FIG. 1 is a side view of a fifth wheel travel trailer.

Referring to FIG. 1, an embodiment of a fifth wheel travel trailer 100 is illustrated. This trailer 100 may include a front end 102 and a rear end 104. For instance, an interior floor 122 of the trailer 100 may lie along a substantially horizontal plane between the front 102 and rear 104 thereof. The single-level trailer 100 may be formed as a body 106 supported by a frame assembly or chassis (not shown). The frame assembly or chassis may be a drop frame assembly or a straight frame assembly. The body 106 and frame assembly may be further supported by one or more wheels 112.

The body 106 may include an overhead roof 108 as shown in FIG. 1. Further, a hitch 110 may be located at the front end 102 of the trailer for coupling to a towing vehicle (not shown). When the trailer 100 is disconnected from the towing vehicle, a support member 130 or landing gear may be provided to support the front end 102 thereof.

The body 106 may include skirting (not shown). In other embodiments, the trailer may not include any skirting.

A door 114 may be coupled to the body 106 to allow access between the interior of the trailer 100 and outside thereof. The door 114, when opened, allows access to an entryway 116 which may be accessed by a set of steps 118 between the ground, G, and a living area 120 of the trailer 100. In one embodiment, the entryway 116 may have a width greater than the typical 30″ found on some multi-level fifth wheel trailers. For instance, the passageway 116 may have a width between 30-40 inches. In a further example, the width may be between 32-38 inches. In yet a further example, the width may be approximately 36 inches. The present disclosure is not intended to be limited to any type of width of the entryway 116.

The trailer 100 may include a first slide out 126 and a second slide out 128. The slide outs, when configured in their deployed positions, allow the single-level living area 120 to increase in living space as the side wall of the body 106 moves outwardly a predetermined distance. While the trailer 100 of FIG. 1 includes a pair of slide outs, this is not intended to be limiting. The trailer 100 may include any number of slide outs for purposes of the present disclosure.

The travel trailer may include a height defined between the floor 122 and ceiling. In some embodiments, the height may be approximately the same throughout, whereas in other embodiments, the height may vary between the front 102 and rear 104. In FIG. 1, a first height, $H_1$, at the rear 104 of the trailer 100 may be approximately, if not exactly, the same as a second height, $H_2$, at the front 102 thereof. For example, the heights may be up to 84 inches. Conventional multi-level fifth wheel travel trailers having varying heights throughout the interior living spaces depending upon the location therein. For instance, a conventional multi-level fifth wheel may have heights that vary between 75 inches and 105 inches, where the less headroom is normally found in those living spaces that are elevated at the front and/or rear of the trailer.

The floor level 122 may separate the living space 120 of the trailer 100 from a storage compartment or basement 124. The storage compartment 124 may be accessed by any one of a plurality of storage doors 132. The storage compartment 124 of the travel trailer 100 of FIG. 1 may be individual compartments or a full pass-through storage space that runs continuously (e.g., uninterrupted) from the rear end 104 of the trailer 100 to a location towards the front end 102 thereof. In FIG. 1, for example, the storage compartment 124 may be a continuous space defined between point A at the rear 104 and point B towards the front 102. The storage compartment 124 may be formed of a single piece of composite material which can reduce the overall cost of the trailer 100. In other embodiments, the storage compartment 124 may be formed of other material besides composite.

In many conventional travel trailers and other recreational vehicles that include one or more slide outs, there are often problems with the seals that are located around an outer periphery of the slide out. Seals can often get worn, torn, or damaged due to the weather such as from the sun, water, snow and ice. These seals are generally formed from rubber or a similar material, and as the seals get worn or damaged, there can be issues with leakage. Once a leak forms, water can easily get into the travel trailer and create mold issues or other structural damage.

In many conventional slide out assemblies, the slide out may have a conventional T-shaped rail along an exterior of the slide out. As the slide out retracts to its closed position, the T-shaped rail may compress against the seal. The compression between the T-shaped rail and the seal, however, can still leave a gap where the sun is able to penetrate and cause wear and tear to the seal. This damage can occur more quickly when the slide out is in its extended or open position where more of the seal is left exposed to the sun and other environmental elements. Thus, there is a need for an improved means for sealing the slide out and exterior wall or surface of the travel trailer or recreational vehicle to prevent any leakage therebetween.

Figure 2:
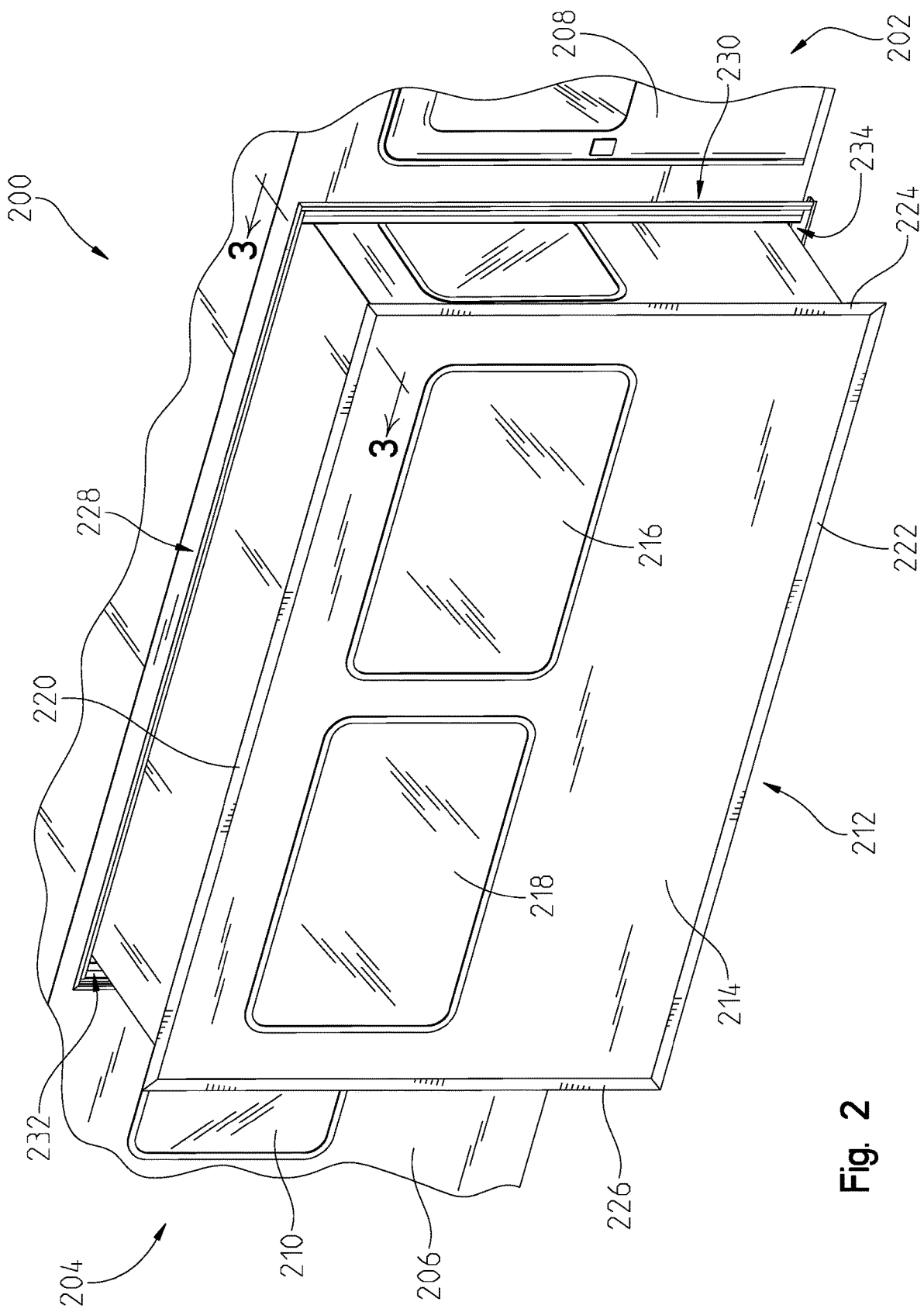
FIG. 2 is a partial perspective view of a slide out assembly of a travel trailer.

Referring to FIG. 2 of the present disclosure, one embodiment of a travel trailer or other recreational vehicle (e.g., fifth wheel trailer, etc.) is disclosed. In one embodiment, the travel trailer may be a powered vehicle having a power system (e.g., engine, transmission, etc.) for propelling it in a travel direction. In another embodiment, the travel trailer may be towed or pulled by a powered vehicle (e.g., a truck) in a travel direction. Other embodiments are contemplated and fit within the scope of the present disclosure.

The travel trailer 200 of FIG. 2 is partially shown but may include features similar to those disclosed in FIG. 1. The trailer 200 may include a front end 202, a rear end 204, and an outer wall or side wall 206. Similar to the embodiment of FIG. 1, the travel trailer 200 may include an entry opening in the side wall 206 whereby a door 208 provides access to an interior of the travel trailer 200. Moreover, in at least some embodiments, the travel trailer 200 may include one or more windows. In FIG. 2, for example, the trailer 200 may include a first window 210.

In some embodiments, the travel trailer 200 may include one or more slide out assemblies. In other embodiments, the trailer may not include any slide out assemblies. In the embodiment of FIG. 2, the travel trailer 200 may include at least one slide out assembly 212. As shown, the slide out assembly 212 is shown in an open or at least partially open position. In this position, the slide out assembly 212 is extended or moved outwardly away from the side wall 206. As is known in the art, moving the slide out assembly 212 to an open position may create additional living space in the interior of the travel trailer 200. This is advantageous in that more space is provided so that more people can occupy the interior of the travel trailer 200.

Referring to the slide out assembly 212 of FIG. 2, the slide out assembly 212 may include an outer wall 214. The outer wall 214 may be formed of a fiberglass material. Other materials may be used for slide out assemblies and the present disclosure is not limited to a fiberglass wall of the slide out assembly.

In several embodiments, the slide out assembly 212 may include one or more windows. In FIG. 2, for example, the slide out assembly 212 may include a first window 216 and a second window 218. Additional windows may be provided. In other embodiments, the slide out assembly 212 may not include any windows.

In the slide out assembly 212 of FIG. 2, an outer trim piece or member may be provided for coming into contact with the side wall 206 of the travel trailer 200 in the closed position. In the illustrated embodiment of FIG. 2, the outer trim member may include an upper trim member 220, a lower trim member 222, a first side trim member 224, and a second side trim member 226. The outer trim members replace the conventional T-molding or T-shaped rails as previously described. The outer trim members are described in further detail below.

The present disclosure contemplates an improvement to the slide out seal assemblies for better sealing the travel trailer and slide out assembly in the closed position. Moreover, the present disclosure provides a better seal assembly which is able to be located relative to the slide out assembly and outer wall to withstand the sun, rain, and other environmental elements.

In FIG. 2, the travel trailer 200 may include a seal assembly. In this embodiment, the seal assembly is shown having an upper seal assembly 228, a first side seal assembly 230, and a second side seal assembly 232. In other embodiments, there may be a lower seal assembly.

As will be described in more detail below, any water that is able to get behind the seal assembly or outer trim members may flow downwardly and exit the travel trailer 200 in a way that is advantageous over conventional trailers. Here, the travel trailer 200 of FIG. 2 may include a pan assembly 234 at or adjacent to the lower trim member 222. Water or ice that flows downwardly may reach the pan assembly 234 and be directed by the shape of the pan assembly 234 out of the trailer 200. In one embodiment, the pan assembly 234 may be formed as a Z-shaped member such that water may flow along a first portion of the pan assembly until it reaches an intermediate portion which may be angled or disposed to induce the water or ice to flow away and out of the trailer. The pan assembly 234 is advantageous over conventional slide out and travel trailers which do not provide a means for easily dispensing water, dirt, debris and other contaminants from the area of the seal assembly. Instead, conventional seal assemblies may be structured such that water, dirt, dust, debris and other contaminants may remain and otherwise interfere with the seal assembly.

Figure 3:
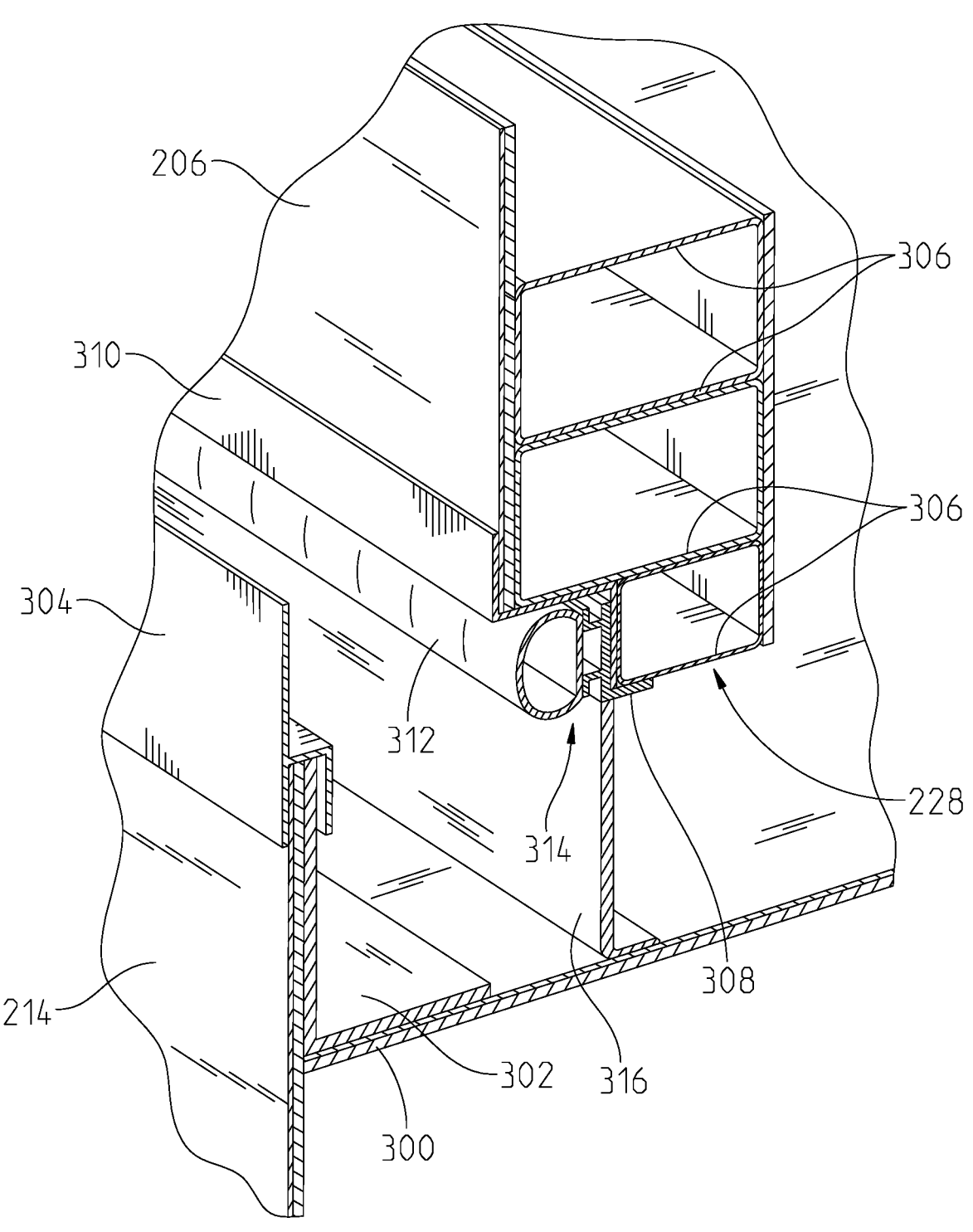
FIG. 3 is a partial cross-sectional perspective view of the slide out assembly taken along line 3-3 in FIG. 2.

Turning to FIG. 3 of the present disclosure, the slide out assembly 212 and outer wall 206 of the travel trailer 200 are shown in greater detail. Specifically with respect to the slide out assembly 212, the slide out assembly 212 may be extended and retracted via one or more cables (not shown) in one embodiment. In another embodiment, the slide out assembly 212 may be actuated between an open position and a closed position via one or more actuators. In one example, the one or more actuators may be a linear actuator. In another example, the one or more actuators may be a mechanical actuator. In a further example, the one or more actuators may be an electric actuator. In yet another example, the one or more actuators may be a hydraulic actuator. In yet further examples, other types of actuators may be used to move the slide out assembly 212 relative to the outer wall 206 of the trailer 200. Moreover, there may be other drive system beyond cables and actuators that may move the slide out assembly 212 between its open and closed positions, and the present disclosure is not limited to any type of drive system.

In FIG. 3, the slide out system 212 may include a slide out body 300. The slide out body 300 is further shown in FIG. 7 where it may include an upright or generally vertical portion 700 and a transverse or generally horizontal portion 702. The slide out body 300 may also include the slide out outer wall 214, which may be referred to as an outer skin in some embodiment. The outer wall may be formed of fiberglass, aluminum, steel or other related material.

Figure 7:
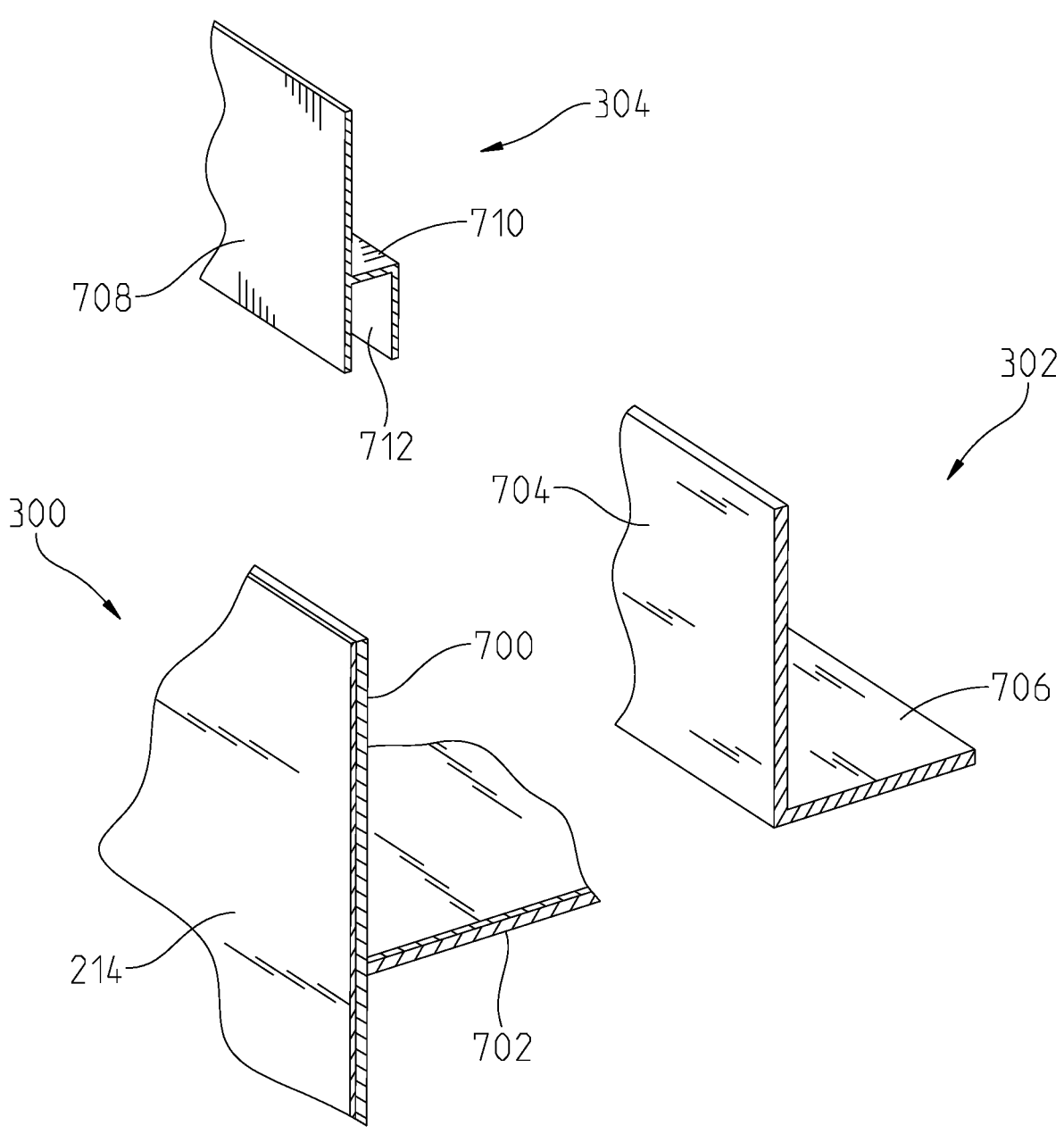
FIG. 7 is a partial exploded perspective view of the slide out assembly.

As shown in FIGS. 3 and 7, the slide out system 212 may also include the outer trim member. In FIG. 3, the upper trim member 220 is depicted. Here, the trim member 220 may be formed as a generally chair-shaped or h-shaped trim member 304. The slide out trim member 304 may be formed of an aluminum or steel material. As shown in FIG. 7, the slide out trim member 304 may include a first member 708 or portion, a second member 710 or portion, and a third member 712 or portion. The various members or portions may form a substantially chair-shaped or h-shaped member as shown. The slide out trim member 304 may form a cap which partially conceals and protects the seal assembly 312. Moreover, the slide out trim member 304 may be installed about the perimeter of the slide out assembly 212 to further close off any gap that may otherwise exist when the slide out assembly 212 is in its closed position.

The slide out assembly 212 may also include a slide out molding member 302 as shown in FIG. 3. The slide out molding member 302 may be generally L-shaped and formed of an aluminum material. In one embodiment, one or more fasteners (e.g., bolts, rivets, screws, etc.) may be used to couple the molding member 302 to the slide out wall 214. In another embodiment, an adhesive may be used to couple the molding member 302 to the wall 214. In a further embodiment, the molding member 302 may be welded to the wall 214. Other known methods may be used for coupling the molding member 302 to an interior surface of the wall 214.

As shown in FIG. 7, the molding member 302 may be generally L-shaped formed by a first portion 704 and a second portion 706. In one example, the first portion 704 may be angled relative to the second portion 706 by up to 90°. In another example, the two portions may be angled less than 90°. In a further example, the two portions may be angled between 45-135° relative to one another. In yet another example, the two portions may be approximately perpendicular to one another.

In a method of assembling the slide out assembly, a slide out body 300 may be provided having an upright portion 700 and a generally horizontal portion 702. A molding member 302 may be provided having a first portion 704 and a second portion 706. The first portion 704 of the molding member 302 may be placed in contact or proximate to the upright portion 700 of the slide out body 300 and the second portion 706 of the molding member 302 may be placed in contact or proximate to the generally horizontal portion 702 of the slide out body 300. The molding member 302 may then be coupled to the slide out body 300 via one or more fasteners, an adhesive, welding, etc. In at least one embodiment, the molding member 302 is coupled directly to the slide out body 300. In the illustrated embodiment of FIG. 3, the molding member 302 is directly coupled to an interior surface of the upright portion 700 and/or an interior surface of the generally horizontal portion 702. Once assembled, the method may further comprise providing a slide out trim or cap member 304. The trim member 304 may be formed having a first member 708, a second member 710 and a third member 712. A gap or channel may be formed between the first member 708 and third member 712 member. As such, the method may include coupling the trim member 304 to the slide out body 300 and molding member 302 by inserting the edge of the upright portion 700 and first portion 704 into the channel formed by the trim member 304. The trim member 304 may then be coupled via an adhesive, a fastener, or welding. Alternatively, the trim member 304 may be press-fit to allow the trim member 304 to be removably coupled to the combined slide out body 300 and molding member 302. In the installed position, the first member 708 of the trim member 304 extends beyond the slide out body 300 and molding member 302 as shown in FIG. 3.

In some embodiments, the molding member 302 is a replacement of the conventional T-molding or rail, which was described above. The molding member 302 may be installed around a perimeter of the slide out assembly before an outer skin of the slide out assembly is installed. During assembly, the skin may at least partially overlap the molding member 302 and thus creating a transparent or invisible perimeter mold. The molding member 302 may provide a desirable compression against the seal assembly 312 when the slide out assembly 212 is in its closed position.

As also shown in FIG. 3 of the present disclosure, the outer wall 206 of the travel trailer 200 along with the seal assembly is shown. Here, the outer wall 206 may be formed by an outer layer or skin of fiberglass, aluminum, steel or other material. The outer layer may be supported by a frame structure 306. A seal support member 308 may be coupled to the frame structure 310 as shown. Moreover, a support structure 316 may further be provided for the outer wall 206. Additional structure or framing may be used to construct the outer wall 206.

Figure 6:
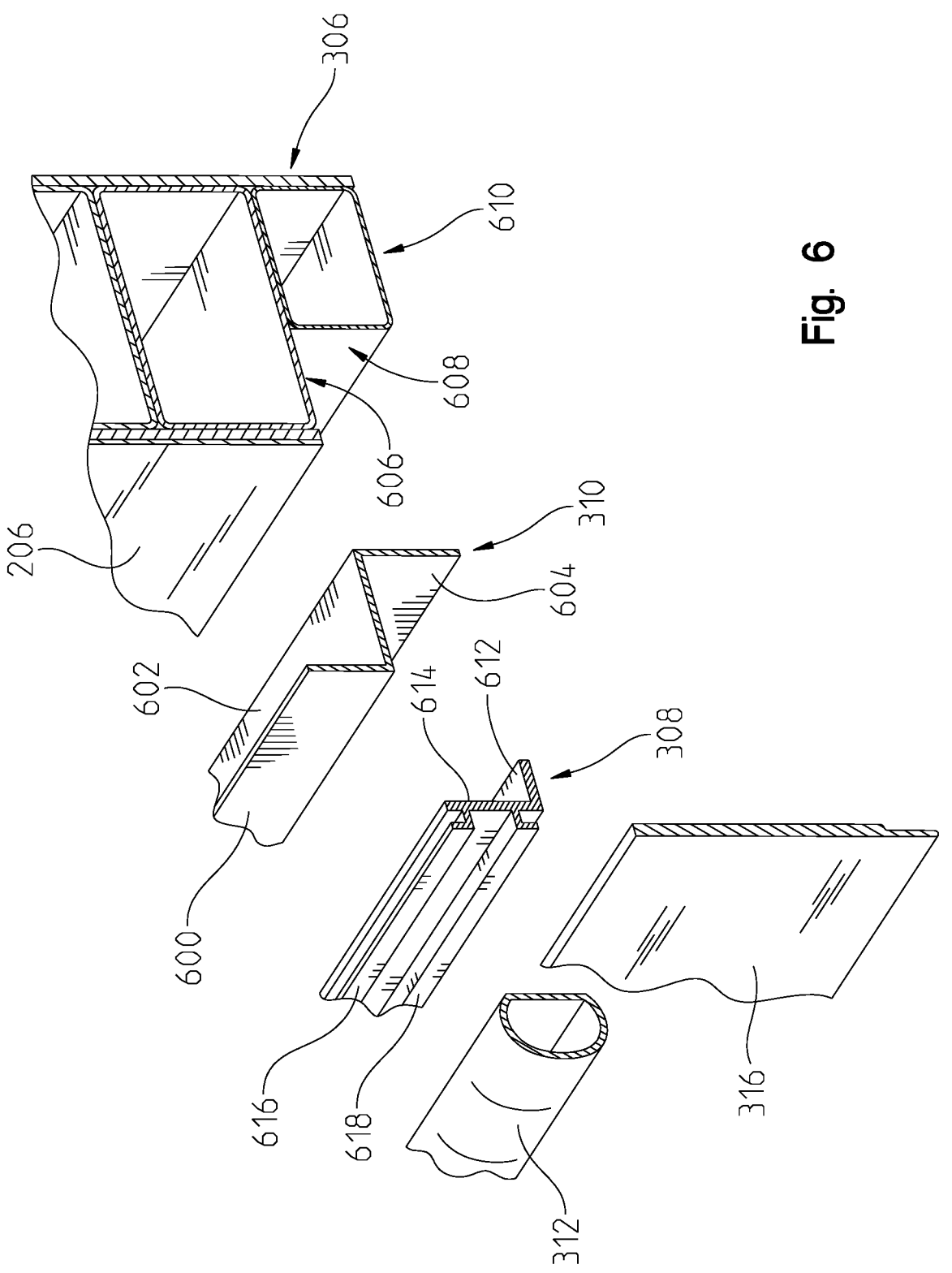
FIG. 6 is a partial exploded perspective view of the seal assembly.

Referring to FIG. 6, the frame structure 306 is shown in greater detail. As shown, the frame structure 306 may define a plurality of surfaces. For example, in one embodiment, the frame structure 306 may define a first surface 606, a second surface 608, and a third surface 610. The first surface 606 and second surface 608 may be approximately perpendicular to one another in one embodiment. In another embodiment, the two surfaces may be angled between 75-105° relative to one another. In a further embodiment, the two surfaces may be angled between 60-120° relative to one another.

In any event, the position or location of the first surface 606 and second surface 608 may define a notch 314 as shown in FIG. 3. The seal support member 308 may be disposed in the notch 314 as shown. The seal support member 308, for example, may include a shelf surface 612 and a back surface 614 on a backside thereof. The seal support member 308 may also include a first front surface 616 and a second front surface 618 as shown in FIG. 6. The first and second front surfaces may be defined on a front side of the seal support member 308.

In one embodiment, a wall cap member 310 may be provided. The wall cap member 310 may be formed of aluminum or steel. In other embodiments, the wall cap member 310 may be formed of other materials including plastic, titanium, or other known material. In one embodiment, the wall cap member 310 may be coupled around the sides and top perimeter of the opening formed in the side wall 206. The wall cap member 310 may be located in the notch 314 to cover it. Further, the wall cap member 310 may provide a mechanism for water that happens to get behind the seal 312 to egress as well as provides an aesthetic, finished appearance to the side wall opening.

As shown in FIG. 6, the wall cap member 310 may be formed as a generally Z-shaped body. In several embodiments, the wall cap member 310 may include a first portion 600, a second portion 602, and a third portion 604. In one embodiment, the first portion 600 and second portion 602 may be angularly disposed relative to one another. In another embodiment, the first portion 600 and second portion 602 may be generally perpendicular to one another. In a further embodiment, the second portion 602 and third portion 604 may be angled relative to one another. In yet a further embodiment, the second portion 602 and third portion 604 may be generally perpendicular to one another.

The seal assembly of FIG. 3 includes a seal 312 as shown. The seal 312 may be a bulb seal or another type of known seal. The seal 312 may be formed of a pliable material such as rubber. Due to this characteristic, the seal 312 may be compressed and return to its uncompressed state. The seal 312 may be located on the top and sides of the opening in the outer wall 206 and thus adjacent to the slide out assembly 212. In FIG. 2, the seal 312 may form part of the upper seal assembly 228, the first side seal assembly 230, and the second side seal assembly 232.

In a method of assembling the seal assembly, the outer wall 206 and frame structure 306 may be provided. The wall cap member 310 may be provided and coupled to the outer wall 206 and frame structure 306. Specifically, the wall cap member 310 may be coupled in the notch area 314. To do so, a back surface of the first portion 600 may be coupled to the surface of the outer wall 206. For example, a fastener such as a bolt, screw, rivet or the like may be used to couple the wall cap member 310 to the outer wall 206. Alternatively, an adhesive may be used for coupling the first portion 600 of the wall cap member 310 to the outer wall 206.

The second portion 602 and third portion 604 may further be coupled to the frame structure 306. Here, a fastener such as a bolt, screw, rivet or the like may be used to couple the wall cap member 310 to the frame structure 306. Once the wall cap member 310 is coupled, the seal support member 308 may be coupled to the third portion 604 of the wall cap member 310. More specifically, the back surface 614 of the seal support member 308 may be coupled via a fastener, adhesive or welding to couple the seal support member 308 to the wall cap member 310. In addition, the shelf surface 612 may be coupled to the third surface 610 of the frame structure 306, as shown in FIG. 3. Once the seal support member 308 is in position, the seal 312 may be coupled to the seal support member 308. Here, a backside of the seal 312 may be coupled to the first front surface 616 and second front surface 618 of the seal support member 308. Adhesive, for example, or other substance may be used for coupling the seal 312 to the seal support member 308.

Figure 4:
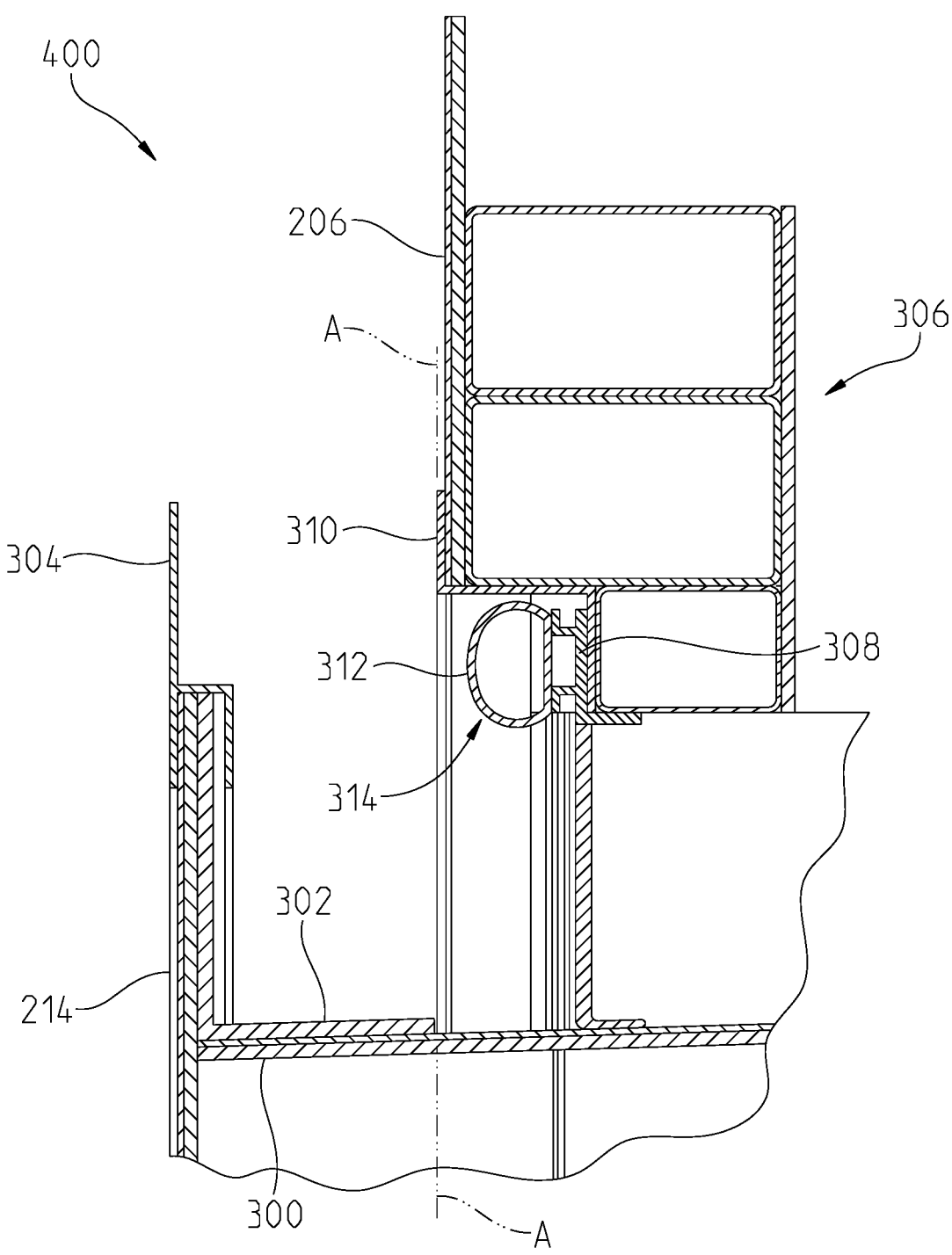
FIG. 4 is a cross-sectional side view of a seal assembly of a slide out assembly in a partially open position.

As shown in FIG. 4 of the present disclosure, a front surface of the first portion 600 of the wall cap member 310 may be defined along a plane A-A. In FIG. 4, the slide out assembly 212 is located in an open or partially open position. In other words, the slide out assembly 212 is moved away from the outer wall 206. In this position, the seal 312 is decompressed. In its decompressed state, the seal 312 remains within the notch 314 and behind (or to the right) of the plane A-A. Thus, the seal 312 can be largely protected from the sun, rain, debris and other contaminants when the slide out assembly 212 is not closed.

Figure 5:
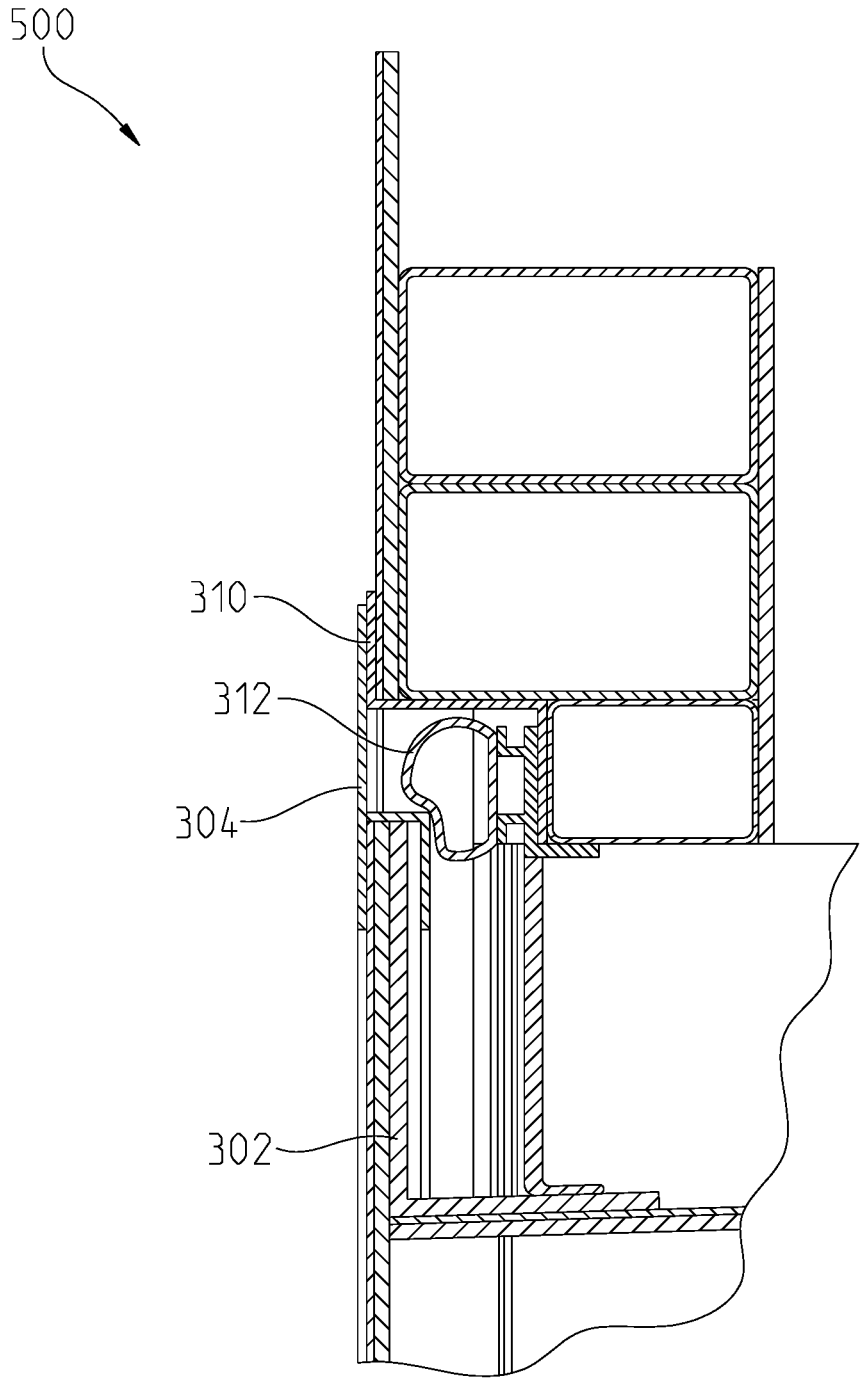
FIG. 5 is a cross-sectional side view of a seal assembly of a slide out assembly in a closed position.

Referring to FIG. 5, the slide out assembly 212 is in its closed position. Here, the slide out assembly 212 is disposed in contact with the outer wall 206 of the travel trailer 200. As shown, the slide out trim member 304 may be located proximate to or in contact with the outer wall 206. In addition, the slide out trim member 304 may contact and at least partially compress the seal 312. The seal 312 may prevent rain, dirt and other debris or contaminants from getting behind the slide out assembly 212. In this arrangement, the seal 312 may be better protected from the elements and provide a better seal to protect the interior of the travel trailer from the same debris and/or mold or other damage.

In other embodiments, corner caps may be coupled at the respective corners of the slide out assembly. These caps may cover miter cuts and also protect against any injury due to the corners of the slide out assembly being sharp.

In additional embodiments, the slide out trim member 304 may be optional. Thus, in at least some embodiments, the slide out assembly 212 may not include the trim member 304 disposed about its perimeter.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A recreational travel trailer, comprising:
a chassis;
a body supported by the chassis, the body including a side wall that forms an opening;
a slide out assembly movably coupled to the body or chassis, the slide out assembly comprising an outer wall forming an outer periphery of the slide out assembly and at least one trim member coupled to the outer periphery of the slide out assembly, wherein the slide out assembly moves between a closed position and an open position relative to the opening in the side wall; and
a seal assembly coupled to the side wall;
wherein the seal assembly is coupled within a notch formed in the side wall;
wherein the seal assembly is disposed in a compressed state when the slide out assembly moves to a closed position;
wherein, in the closed position, the only portion of the slide out assembly disposed in contact with the seal assembly is an intersection formed by a first member and a second member of the at least one trim member.

2. The recreational travel trailer of claim 1, wherein, in the closed position, only a portion of the seal assembly is partially compressed.

3. The recreational travel trailer of claim 1, wherein, in the closed position, the seal assembly is located between the at least one trim member and the side wall.

4. The recreational travel trailer of claim 1, wherein the seal assembly comprises a bulb seal.

5. The recreational travel trailer of claim 1, wherein the seal assembly is coupled to the side wall along at least three sides of the opening.

6. The recreational travel trailer of claim 1, wherein the at least one trim member comprises a top trim member, a first side trim member, and a second side trim member;
wherein, the seal assembly is disposed in contact with the top trim member, the first side trim member, and the second side trim member in the closed position.

7. The recreational travel trailer of claim 1, wherein the at least one trim member comprises an h-shaped cross-section.

8. The recreational travel trailer of claim 7, wherein the at least one trim member comprises a first portion, a second portion, and a third portion, the first portion and third portion being generally parallel to one another and the second portion being generally perpendicular to the first portion and the third portion.

9. The recreational travel trailer of claim 8, wherein the outer wall of the slide out assembly is located within a space formed between the first portion, second portion, and third portion of the at least one trim member.

10. A recreational travel trailer, comprising:
a chassis;
a body supported by the chassis, the body including a side wall;
a slide out assembly movably coupled to the body or chassis, the slide out assembly comprising an outer wall forming an outer periphery of the slide out assembly and a trim member coupled to the outer periphery of the slide out assembly, wherein the slide out assembly moves between a closed position and an open position relative to the side wall;

a wall cap member coupled to the side wall and forming a notch;

a seal assembly coupled to the wall cap member, the seal assembly comprising a seal support member and a seal;

wherein the seal assembly is located within the notch;

wherein the wall cap member comprises a first portion aligned within a generally vertical plane;

wherein, in the open position, the outer wall is located offset to one side of the vertical plane and the seal assembly is located offset to an opposite side of the vertical plane;

wherein, in the closed position, the seal is in contact only between the seal support member and the trim member.

11. The recreational travel trailer of claim 10, further comprising a molding member disposed in contact with the outer wall of the slide out assembly;

wherein the outer wall of the slide out assembly and the molding member are located within a space formed between a first portion, a second portion, and a third portion of the trim member.

12. The recreational travel trailer of claim 10, wherein the seal assembly is disposed in a compressed state when the slide out assembly moves to the closed position.

13. The recreational travel trailer of claim 10, wherein the wall cap member comprises a generally Z-shaped cross-section.

14. The recreational travel trailer of claim 10, wherein the seal support member comprises:

a first front surface and a second front surface;

a rear surface located offset from the first front surface and the second front surface; and a shelf surface coupled to and disposed generally perpendicular to the rear surface;

wherein the seal is coupled to the first front surface and the second front surface.

15. The recreational travel trailer of claim 14, wherein the rear surface of the seal support member is coupled to the wall cap member.

16. The recreational travel trailer of claim 14, wherein the side wall comprises a frame structure to which the shelf surface of the seal support member is coupled.

17. The recreational travel trailer of claim 10, wherein, in the closed position, the seal is only partially compressed.

18. The recreational travel trailer of claim 10, wherein, in the closed position, the seal assembly is located between the at least one trim member and the side wall.

19. A recreational travel trailer comprising:

a chassis;

a body supported by the chassis and including a side wall, the side wall comprising a frame structure;

a slide out assembly movably coupled to the body or chassis, the slide out assembly comprising an outer wall forming an outer periphery of the slide out assembly and a trim member coupled to the outer periphery of the slide out assembly, wherein the slide out assembly moves between a closed position and an open position relative to the side wall;

a wall cap member coupled to the side wall and the frame structure, wherein a cross-section of the wall cap member is generally Z-shaped; and a seal assembly coupled to the wall cap member, the seal assembly comprising a seal support member and a seal;

wherein, in the closed position, the at least one trim member is disposed in contact with the seal assembly;

wherein, in the closed position, the seal assembly is located between the at least one trim member and the side wall.

20. The recreational travel trailer of claim 19, wherein the side wall, the frame structure and the wall cap member form a notch, the seal assembly being located in the notch.

\* \* \* \* \*